United States Patent
Kapilavai et al.

(10) Patent No.: US 10,054,314 B2
(45) Date of Patent: Aug. 21, 2018

(54) SLOTTED INJECTOR FOR AXIAL FUEL STAGING

(71) Applicant: General Electric Company, Schenectady, NY (US)

(72) Inventors: Sravan Kumar Dheeraj Kapilavai, Schenectady, NY (US); Wei Zhao, Greer, SC (US); Shivakumar Srinivasan, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 425 days.

(21) Appl. No.: 14/973,375

(22) Filed: Dec. 17, 2015

(65) Prior Publication Data

US 2017/0176015 A1    Jun. 22, 2017

(51) Int. Cl.
| | |
|---|---|
| *F23R 3/34* | (2006.01) |
| *F23R 3/36* | (2006.01) |
| *F02C 3/14* | (2006.01) |
| *F02C 3/20* | (2006.01) |
| *F02C 7/22* | (2006.01) |

(52) U.S. Cl.
CPC ............... *F23R 3/36* (2013.01); *F02C 3/14* (2013.01); *F02C 3/20* (2013.01); *F02C 7/222* (2013.01); *F05D 2220/32* (2013.01); *F05D 2260/60* (2013.01)

(58) Field of Classification Search
CPC .... F23R 3/346; F23R 3/34; F23R 3/06; F23R 3/286; F02C 7/22; F01D 9/023
See application file for complete search history.

(56) References Cited

U.S. PATENT DOCUMENTS

| | | | | |
|---|---|---|---|---|
| 5,239,818 A * | 8/1993 | Stickles | .................... | F23R 3/04 60/737 |
| 7,762,073 B2 * | 7/2010 | Li | .............................. | F23R 3/14 60/734 |
| 8,001,761 B2 * | 8/2011 | Myers, Jr. | ................. | F02C 9/28 60/39.281 |
| 8,479,518 B1 * | 7/2013 | Chen | ....................... | F23R 3/002 60/733 |

(Continued)

*Primary Examiner* — William H Rodriguez
*Assistant Examiner* — Stefan Ibroni
(74) *Attorney, Agent, or Firm* — GE Global Patent Operation; John Darling (57) ABSTRACT

An axial fuel staging injector for a gas turbine includes a body. The body includes an upstream end and a downstream end. The body defines a primary compressed air flow path through which compressed air flows from a compressed air source to a transition duct of a gas turbine combustor. The body includes a plurality of outlets disposed on an interior surface thereof. Each outlet of the plurality of outlets includes a secondary fuel conduit in fluid communication with a secondary fuel source, and includes a first wall that defines a secondary fuel path. The secondary compressed air conduit is in fluid communication with a compressed air source, and includes a second wall disposed about the first wall in a substantially coannular arrangement, wherein the first wall and the second wall define a secondary compressed air flow path. Each outlet is configured to inject a secondary fuel and compressed air into the primary compressed air flow path in a direction transverse to the primary compressed air flow path forming a fuel-air mixture.

14 Claims, 7 Drawing Sheets

(56) References Cited

U.S. PATENT DOCUMENTS

| | | |
|---|---|---|
| 8,701,382 B2 | 4/2014 | Davis, Jr. et al. |
| 8,701,383 B2 | 4/2014 | Venkataraman et al. |
| 8,701,418 B2 | 4/2014 | Venkataraman et al. |
| 8,707,707 B2 | 4/2014 | Venkataraman et al. |
| 8,745,897 B2 | 6/2014 | Wojnar et al. |
| 8,904,796 B2 | 12/2014 | Singh |
| 8,919,137 B2 | 12/2014 | DiCintio et al. |
| 9,010,120 B2 | 4/2015 | DiCintio et al. |
| 9,151,500 B2 * | 10/2015 | Chen .................. F23R 3/04 |
| 9,243,507 B2 * | 1/2016 | Stoia .................. F01D 9/023 |
| 9,303,872 B2 * | 4/2016 | Hadley ................ F23R 3/20 |
| 9,644,845 B2 * | 5/2017 | Crothers ............... F23R 3/34 |
| 2013/0067921 A1 | 3/2013 | Hadley et al. |
| 2013/0174558 A1 * | 7/2013 | Stryapunin ........... F23R 3/286 |
| | | 60/734 |
| 2013/0213046 A1 | 8/2013 | Melton |
| 2013/0283801 A1 * | 10/2013 | Romig ................. F23R 3/28 |
| | | 60/733 |
| 2014/0123653 A1 | 5/2014 | Stoia et al. |

* cited by examiner

SLOTTED INJECTOR FOR AXIAL FUEL STAGING

BACKGROUND

The subject matter disclosed herein relates to gas turbines, and more specifically, to injectors for axial fuel staging in gas turbines.

In a gas turbine engine, combustible materials (e.g., fuel mixed with air) are combusted in a combustor, producing high-energy combustion fluids. The combustion fluids are directed to a turbine via a transition duct, where the combustion fluids aerodynamically interact with turbine blades, causing them to rotate. The turbine may be coupled to a compressor by one or more shafts such that the rotating blades of the turbine drive the compressor. The turbine may be used to generate electricity, power a load, or some other use.

Emissions (e.g., $NO_X$ emissions) of the gas turbine engine may be reduced by increasing the consumption of the combustible materials during combustion, resulting in a more complete combustion reaction. Injecting additional combustible materials into the combustion fluids as they pass through the transition duct (i.e., "axial fuel staging") may increase the temperature and energy of the combustion fluids, and lead to a more ideal consumption of fuel, thus reducing emissions (e.g., $NO_X$ emissions).

Figure 1:
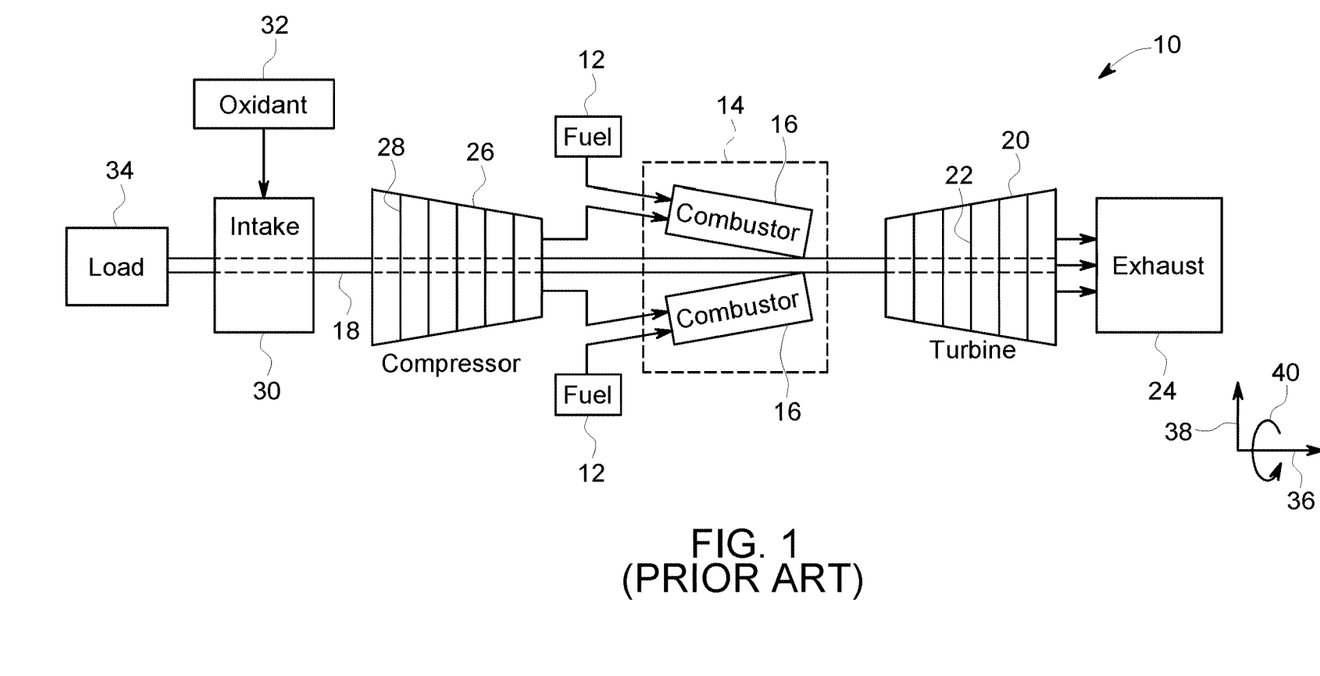
FIG. 1 is a block diagram of an embodiment of a gas turbine engine.

Turning now to the figures, FIG. 1 is a block diagram of an embodiment of a turbomachine system (e.g., gas turbine engine 10). The gas turbine engine 10 may use liquid and/or gas fuel to drive the gas turbine engine 10. The fuel may be any suitable gaseous or liquid fuel, such as natural gas, liquefied natural gas (LNG), syngas, associated petroleum gas, methane, ethane, butane propane, biogas, sewage gas, landfill gas, coal mine gas, gasoline, diesel, naphtha, kerosene, methanol, biofuel, or any combination thereof. Fuel may be directed from one or more fuel supplies 12 to a combustor section 14. The fuel may be mixed with oxidant, such as air, at one or more points in the combustor section 14. The oxidant-fuel mixture combusts in one or more combustors 16 (e.g., combustor cans) of the combustor section 14, thereby creating hot pressurized combustion gases.

In some embodiments, the gas turbine engine 10 may include combustors 16 disposed about a shaft 18. Each combustor 16 may direct combustion gases into a turbine 20, which may have one or more stages 22, toward an exhaust outlet 24. Each stage 22 may include a set of blades coupled to a respective rotor wheel, coupled to the shaft 18. As the combustion gases cause rotation of turbine blades, the shaft 18 rotates to drive a compressor 26. Eventually, the gas turbine engine 10 exhausts the exhaust gases through the exhaust outlet 24.

One or more stages 28 of the compressor 26 compress the oxidant (e.g., air) from the oxidant intake 30. The one or more stages 28 may be coupled to the shaft 18. Each stage 28 includes blades that rotate to increase the pressure and to provide compressed oxidant. As the blades within the compressor 26 rotate, oxidant is drawn from an oxidant supply 32.

The compressed discharge oxidant from the compressor 26 is directed into one or more combustors 16 in the combustor section 14 to mix with the fuel. For example, fuel nozzles of the combustor section 14 may inject fuel and compressed oxidant into the combustors 16 in a suitable ratio for combustion. For example, suitable combustion may substantially completely combust the fuel with minimal emissions.

The shaft 18 may also be coupled to a load 34, which may be a mobile or a stationary load, such as a propeller on an aircraft or an electrical generator in a power plant. The load 34 may include any suitable device capable of being powered by the rotational output of the gas turbine engine 10.

Figure 2:
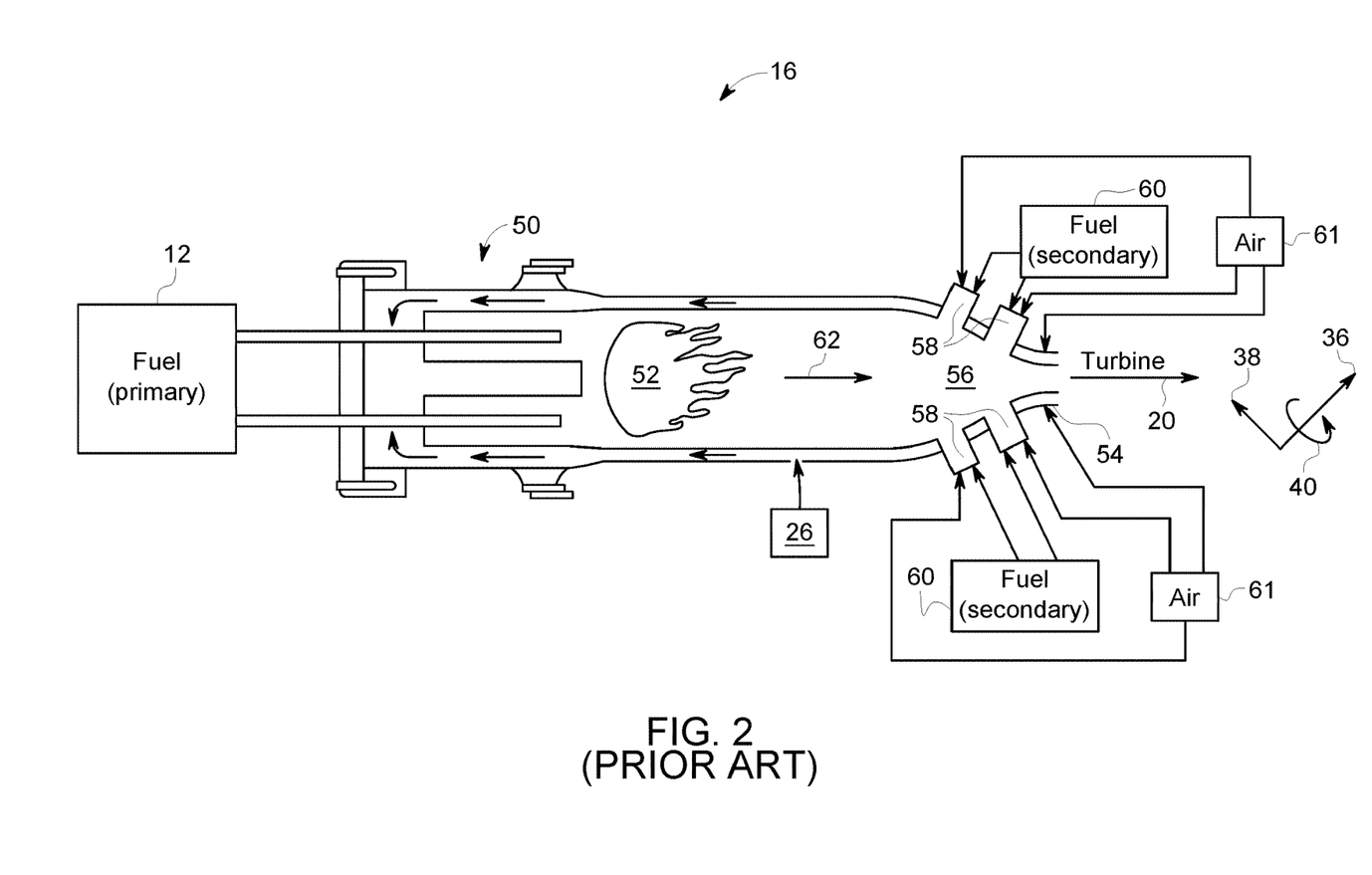
FIG. 2 is a schematic of one embodiment of a combustor in accordance with aspects of the present disclosure.

FIG. 2 is a schematic of an exemplary combustor 16. The combustor has a head end 50, where fuel from the primary fuel supply 12 is mixed with air from the compressor 26. The fuel/air mixture is combusted in a first combustion zone 52. The fluids then travel down the combustor 16 to a transition duct 54, which includes a second combustion zone 56. The transition duct 54 may include a plurality of axial fuel staging (AFS) injectors 58 in one or more axial planes (injectors 58 being located in two planes in FIG. 2) and distributed circumferentially about the transition duct 54. However, AFS may also be applied to a combustor liner and transition duct combination, or a unibody combustor. The AFS injectors inject a second fuel from a secondary fuel source 60, mix the second fuel with compressed air from a compressed air source 61 (e.g., compressor 26), and inject the mixture in a direction that is generally transverse to the predominant flow direction 62. The second fuel and air mixture may combust in the second combustion zone 56. In some embodiments, the secondary fuel may be provided from a secondary fuel supply 60, in which case the secondary fuel or fuels may be more volatile than the primary fuel (e.g., any suitable gaseous or liquid fuel, such as natural gas, liquefied natural gas (LNG), syngas, associated petroleum gas, methane, ethane, butane propane, biogas, sewage gas, landfill gas, coal mine gas, gasoline, diesel, naphtha, kerosene, methanol, biofuel, or any combination thereof). In some embodiments, the secondary fuel may be the same fuel as the primary fuel and may be provided from the primary fuel supply 12. Injecting a second fuel/air mixture in the transition duct 54, as well as the head end 50, helps to encourage more complete combustion, which may reduce certain emissions (e.g., $NO_X$ emissions).

Figure 3:
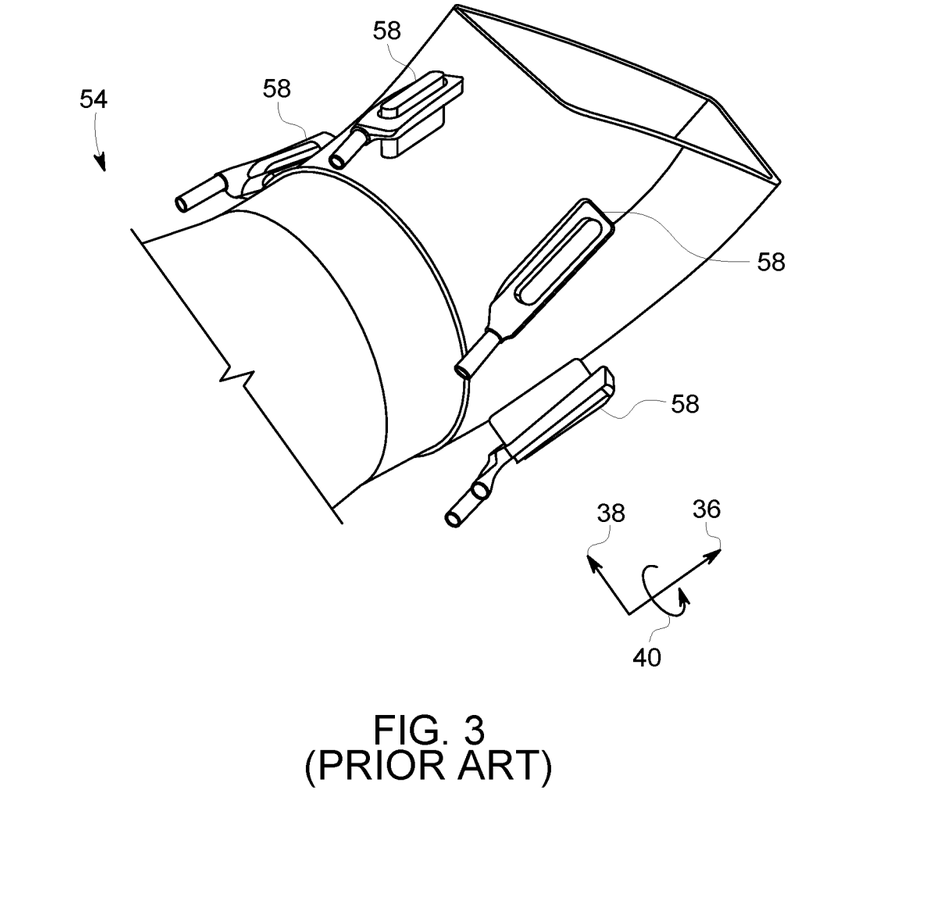
FIG. 3 is a perspective section view of one embodiment of a transition duct, with axial fuel staging (AFS) injectors disposed circumferentially about the transition duct in accordance with aspects of the present disclosure.

FIG. 3 shows a perspective section view of the transition duct 54, with AFS injectors 58 disposed circumferentially 40 about the transition duct 54. Such injectors 58 may be the same or similar to those described in commonly assigned U.S. patent application Ser. No. 13/233,127, the disclosure of which is incorporated by reference herein. As can be seen in FIG. 3, the AFS injectors 58 are "slotted" in that they are longer in the axial direction 36 than they are wide (in the circumferential direction 40). Compressed air from the compressor 26 is passed through each AFS injector 58. Each AFS injector 58 then injects the secondary fuel into the flow path of the compressed air through orifices. The slotted AFS injector 58 extends in the radial direction 38 through a reversed flow region or cooling sleeve and into the compressor discharge volume surrounding the combustor 16. The AFS injector 58 also extends in the axial direction 36, which is substantially aligned with the predominant flow path 62 through the transition duct 54. The AFS injector 58 also extends in the circumferential direction 40.

While the aforementioned injector systems for axial fuel staging may possess certain advantages, it would be desirable to further develop hardware and techniques for axial fuel staging to further increase combustible material consumption and reduce emissions in gas turbine engines. Such an objective is addressed by the present disclosure.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, an axial fuel staging injector for a gas turbine includes a body. The body includes an upstream end and a downstream end. The body defines a primary compressed air flow path through which compressed air flows from a compressed air source to a transition duct of a gas turbine combustor. The body includes a plurality of outlets disposed on an interior surface thereof. Each outlet of the plurality of outlets includes a secondary fuel conduit in fluid communication with a secondary fuel source, and includes a first wall that defines a secondary fuel path. The secondary compressed air conduit is in fluid communication with a compressed air source, and includes a second wall disposed about the first wall in a substantially coannular arrangement, wherein the first wall and the second wall define a secondary compressed air flow path. Each outlet is configured to inject a secondary fuel and compressed air into the primary compressed air flow path in a direction transverse to the primary compressed air flow path forming a fuel-air mixture.

In a second embodiment, a gas turbine engine includes a compressor and a combustor. The compressor is configured to compress air. The combustor is configured to receive compressed air from the compressor, receive a primary fuel from a primary fuel source, and combust a mixture of the compressed air and primary fuel, resulting in combustion fluids. The combustor includes a transition duct and an axial fuel staging injector. The transition duct fluidly couples the combustor to a turbine, configured to direct the combustion fluids toward the turbine. The axial fuel staging injector is coupled to the transition duct and includes a body and a plurality of outlets disposed on an interior surface of the body. The body defines a primary compressed air flow path through which compressed air flows from a compressed air source to a transition duct of a gas turbine combustor. Each outlet of the plurality of outlets includes a secondary fuel conduit in fluid communication with a secondary fuel source, and includes a first wall that defines a secondary fuel path. The secondary compressed air conduit is in fluid communication with a compressed air source, and includes a second wall disposed about the first wall in a substantially coannular arrangement, wherein the first wall and the second wall define a secondary compressed air flow path. Each outlet is configured to inject a secondary fuel and compressed air into the primary compressed air flow path in a direction transverse to the primary compressed air flow path forming a fuel-air mixture.

In a third embodiment, an axial fuel staging (AFS) method includes receiving a secondary fuel flow from a secondary fuel source; receiving a primary compressed air flow from a compressed air source; diverting a secondary compressed air flow from the primary compressed air flow; directing the secondary compressed air flow around the secondary fuel flow in a substantially coannular arrangement; injecting, via a coannular arrangement of orifices, the secondary fuel flow and the secondary compressed air flow into the primary compressed air flow in a direction substantially transverse to the primary compressed air flow, forming an fuel-air mixture; and directing the fuel and air mixture into a combustor of a gas turbine engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Combustible materials are combusted in a combustor of a gas turbine engine to form high-energy combustion fluids, which are directed through a transition duct to a turbine. In the turbine, the combustion fluids aerodynamically interact with blades, causing the blades of the turbine to rotate. By injecting additional combustible materials to the combustion fluids as they travel through the transition duct (i.e., axial fuel staging), a more complete combustion reaction may be achieved, resulting in a large percentage of combustible material consumption and reduced emissions. By injecting fuel and compressed air in a coannular arrangement into a flow of compressed air from the head end to the transition duct, the fuel has higher momentum, resulting in better jet penetration into the primary compressed air through the slotted duct. This in turn allows it to mix thoroughly with the compressed air. This way the axially staged fuel-air mixture will be more thoroughly mixed upon reaching the combustion fluids in the transition duct.

Figure 4:
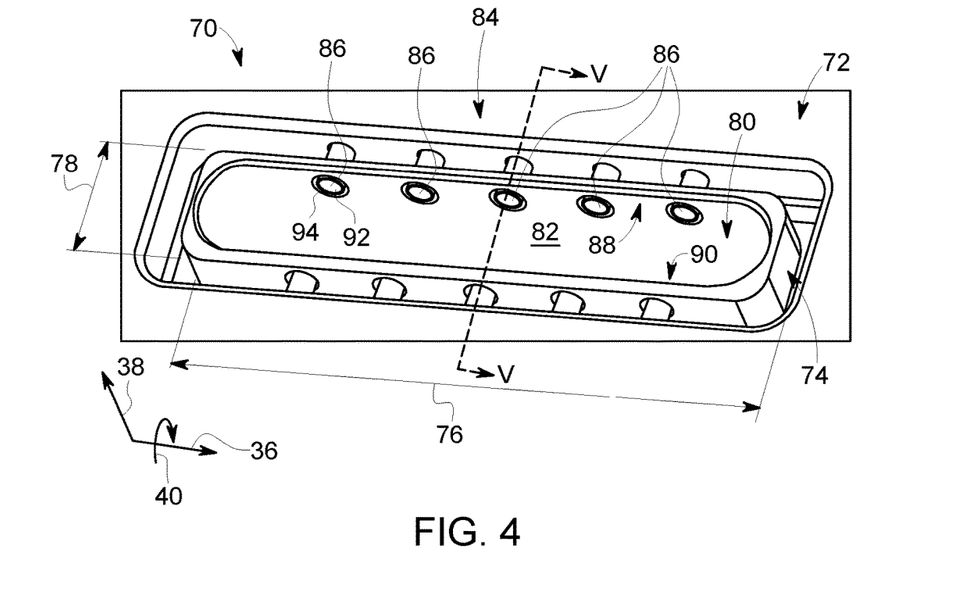
FIG. 4 is perspective view of one embodiment of a coannular outlet AFS injector in accordance with aspects of the present disclosure.

FIG. 4 shows a perspective section view of a coannular AFS injector 70. The coannular AFS injector 70 extends in the radial direction 38 to a wall of the transition duct 54. The coannular AFS injector 70 comprises an outward facing portion 72 and a body 74. The outward facing portion 72 faces outward relative to the longitudinal axis of the combustor 16. The body 74 having a length 76 that extends in the axial direction 36, which is substantially aligned with the predominant flow path 62 through the transition duct 54. The body 74 also has a depth 78. The coannular AFS injector 70 may have an interior surface 80 that defines a primary compressed air flow path 82. The outward facing portion 72 contains an injection system 84 disposed at the upstream end of the coannular AFS injector 70 for injecting the secondary fuel and compressed air into the primary compressed air flow path 82. As shown in FIG. 4, the injection system 88 may include a number of outlets 86 disposed on the interior surface 80 of the coannular AFS injector 70. The outlets 86 may be disposed on one or both of the fore 88 and aft 90 sides of the coannular AFS injector 70. There may be any number of outlets 86 disposed on either side 88, 90 of the coannular AFS injector 70. For example, possible embodiments may have 0, 1, 2, 3, 4, 5, 6, 7, 8, 9, 10, 12, 14, 16, 18, 20, 22, 24, 26, 28, 30, or any other number of outlets 86 on each side 88, 90. In some embodiments, there may also be outlets 86 disposed along the depth 78 of the coannular AFS injector 70. Each outlet 86 may include a secondary fuel orifice 92 and secondary compressed air orifice 94 disposed about the secondary fuel orifice 92 in a coannular fashion. As compressed air flows along the primary compressed air flow path 82, in the radial direction 38 through the interior of the coannular AFS injector 70, the outlets 86 inject the secondary fuel (e.g., through secondary fuel orifice 92) and compressed air (e.g., through secondary compressed air orifice 94) into the primary compressed air stream 82 at a direction generally transverse to the compressed air flow path 82. It has been found that compressed air and secondary fuel injected through the outlets 86 in a coannular arrangement results in more complete mixing of the secondary fuel and compressed air. As will be discussed in more detail with regard to FIGS. 5-7, the outlets 86 may be configured to inject compressed air and a secondary fuel into the primary compressed air flow path 82 in a coannular fashion.

Figure 5:
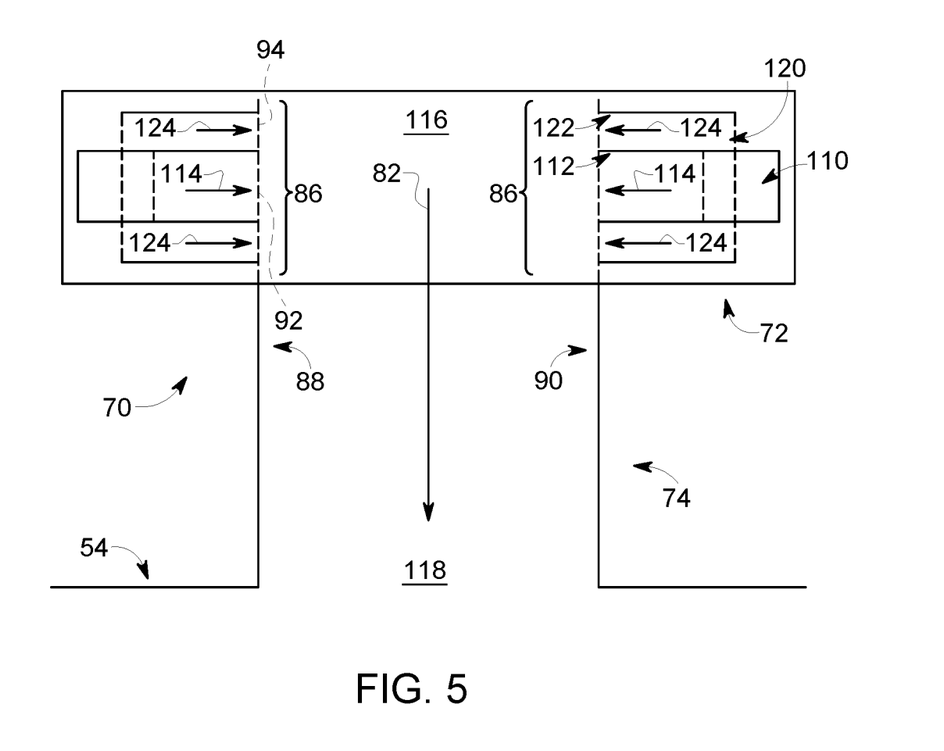
FIG. 5 is a schematic cross-sectional view of one embodiment of a coannular outlet AFS injector of FIG. 4, as taken along line V-V, in accordance with aspects of the present disclosure.

FIG. 5 is a cross sectional schematic of a coannular orifice AFS injector 70, as shown from the line V-V in FIG. 4, according to the present disclosure. A perspective section view of two coannular outlets 86 in the AFS injector 70 is shown in FIG. 6.

As shown in FIG. 5, secondary fuel from a secondary fuel source is drawn through a secondary fuel manifold 110 and into a secondary fuel conduit 112 defining a secondary fuel flow path 114. The primary compressed air flow path 82 passes from an upstream end 116 of the injector 70 to a downstream end 118 of the injector 70, which contacts the transition duct 54. A portion of the primary compressed air flow is routed through a secondary compressed air manifold 120 to a substantially oval secondary compressed air conduit 122 that is concentric with (radially outward of and encircling) the secondary fuel conduit 114. The secondary compressed air flow path 124 is directed around the secondary fuel flow path 114 in a coannular fashion (in what may be described as a tube-in-tube assembly), such that secondary fuel and compressed air are injected as a coannular stream into the primary compressed air flow path 82 in a direction transverse to the direction of the primary compressed air flow path 82. The secondary fuel conduit 112 and the secondary compressed air conduit 154 together define a secondary compressed air flow path 124 in fluid communication with the primary compressed air flow path 82.

A number of coannular outlets 86 may be located along the length and depth of the coannular AFS injector 70 to provide multiple injection points for the introduction of coannular secondary fuel/air streams. Though FIG. 5 shows a single outlet 86 on each of the fore and aft sides 88, 90 of the coannular AFS injector 70, it should be understood that one or both of the fore and aft sides 88, 90 may include multiple outlets 86 and respective conduits 112, 122, fluidly coupled to manifolds 110, 120 configured to distribute compressed air and secondary fuel to the respective conduits 112, 122. Each outlet 86 is formed by a tube-in-tube assembly, which includes secondary fuel conduit 112 and secondary compressed air conduit 122, as shown in FIGS. 6 and 7. Injecting secondary fuel and compressed air into the compressed air flow path 82 helps to improve mixing between the secondary fuel and the compressed air, increasing the momentum of the secondary fuel, thereby causing better penetration and mixing with compressed air.

Figure 6:
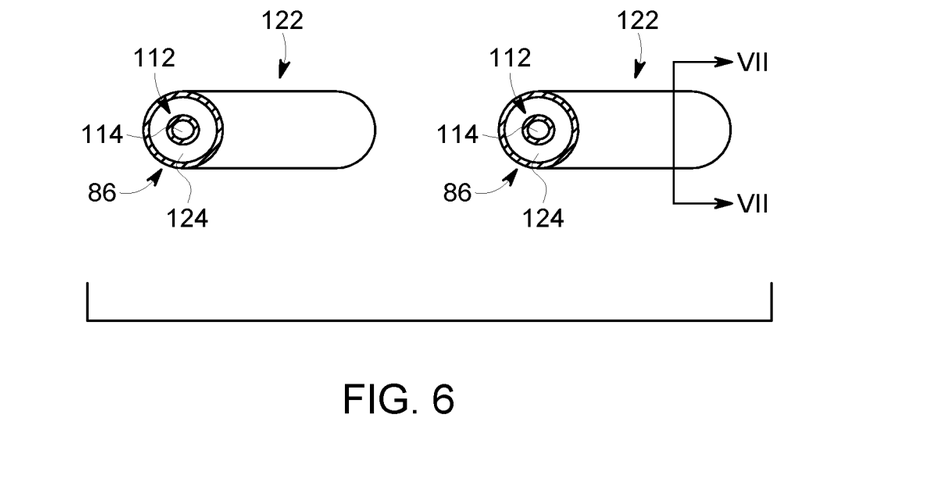
FIG. 6 is a perspective section view of one embodiment of two coannular outlets in an AFS injector in accordance with aspects of the present disclosure.
Figure 7:
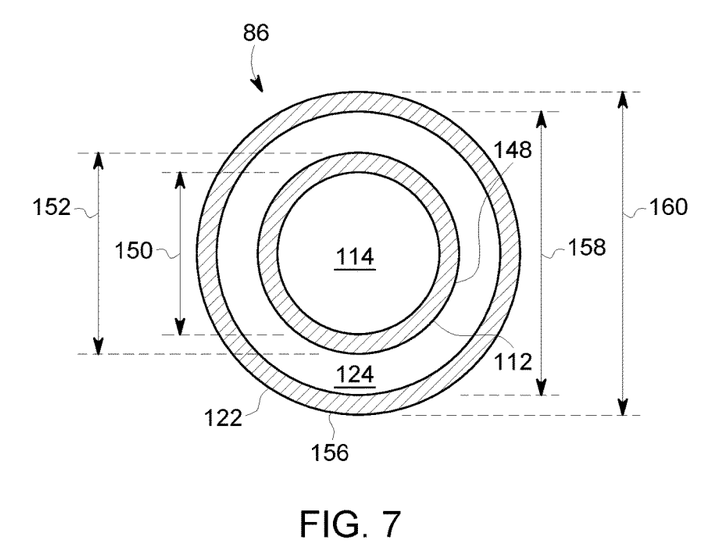
FIG. 7 is a section view of one embodiment of a coannular outlet in accordance with aspects of the present disclosure.

FIG. 7 is a section view of a coannular outlet 86, as taken along line VII-VII of FIG. 6. Secondary fuel flows through the secondary fuel flow path 114 within a secondary fuel conduit 112. The secondary fuel conduit has a first wall 148 with an inside diameter 150 and an outside diameter 152. In the exemplary embodiment shown, the inside diameter 150 of the first wall 148 is approximately 0.105 inches, and the outside diameter of the first wall 148 is approximately 0.125 inches, but other dimensions may be possible. Compressed air flows through the secondary compressed air flow path 124 through a secondary compressed air conduit 122. The secondary compressed air conduit 122 has a second wall 156 with an inside diameter 158, and an outside diameter 160. In the exemplary embodiment shown, the inside diameter 158 of second wall 156 is approximately 0.175 inches, the outside diameter 160 of the second wall 156 is approximately 0.195 inches, but other dimensions may be possible. Note that as depicted, the secondary compressed air flow path 124 is disposed about the secondary fuel flow path 114 in a substantially coannular, and in some embodiments coaxial, arrangement.

Figure 8:
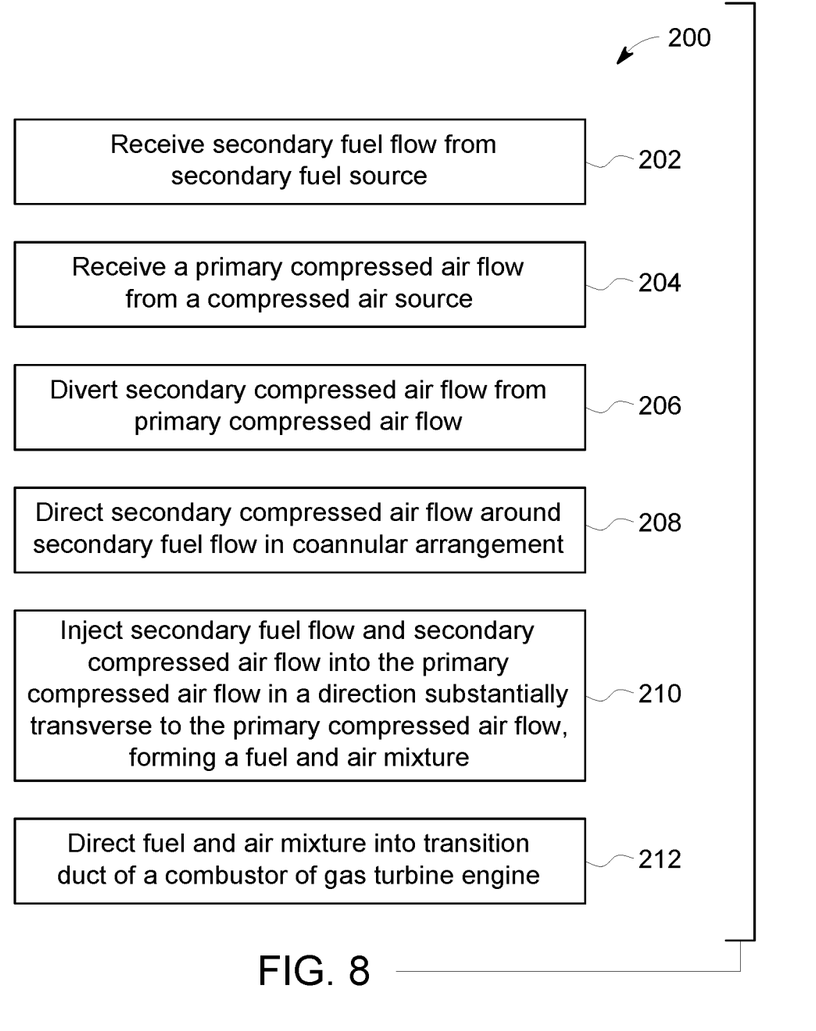
FIG. 8 is a flow chart of one embodiment of an axial fuel staging process in accordance with aspects of the present disclosure.

FIG. 8 is a flow chart of one embodiment of an axial fuel staging process 200. In block 202, a secondary fuel flow is received from a secondary fuel source. The secondary fuel may be any suitable gaseous or liquid fuel, such as natural gas, liquefied natural gas (LNG), syngas, associated petroleum gas, methane, ethane, butane propane, biogas, sewage gas, landfill gas, coal mine gas, gasoline, diesel, naphtha, kerosene, methanol, biofuel, or any combination thereof. Alternately, the secondary fuel may be received from the primary fuel supply and, thus, may be the same type of fuel. The secondary fuel flow may be received by a secondary fuel manifold 110, and distributed to one or more secondary fuel conduits 112. In block 204, a primary compressed air flow may be received from a compressed air source. The compressed air flow may come directly from the compressor 26 or from other compressed air source.

In block 206, a secondary compressed air flow is diverted from the primary compressed air flow 82, through a secondary compressed air manifold 120, and distributed to one or more secondary compressed air conduits 122. One embodiment of diverting the secondary compressed air flow from the primary compressed air flow was shown and discussed with regard to FIG. 5. In block 208, the secondary compressed air flow may be directed around the secondary fuel path 114 in a coannular arrangement. For example, the secondary compressed air flow may be directed through the secondary compressed air conduit 122, which is substantially coannular, and in some case coaxial, with the secondary fuel conduit 112, as shown and discussed with regard to FIG. 5. One embodiment of the secondary fuel conduit 112 and the secondary compressed air conduit 122 is shown in FIG. 7. In the embodiment of FIG. 7, the first wall 148 defines the secondary fuel flow path 114. The second wall 156, disposed about the first wall 148 in a coannular arrangement, and the first wall 148 define a secondary compressed air flow path 124. The secondary fuel flow and the secondary compressed air flow are directed through the respective conduits 112, 122 to one or more coannular outlets 86.

In block 210 the secondary fuel flow and the secondary compressed air flow are injected (e.g., through coannular outlet 86) into the primary compressed air flow 82 (e.g., through the body 74 of the AFS injector 70) in a direction substantially transverse to the primary compressed air flow path 82. The secondary fuel mixes with the compressed air as it flows, forming a fuel and air mixture. In block 212, the fuel and air mixture are directed into the transition duct 54 of the combustor 16 of the gas turbine engine 10.

Technical effects of the invention include coannular injection of secondary fuel and compressed air into a compressed air stream, which is directed to the transition duct of a gas turbine combustor. The disclosed techniques improve mixing of the compressed air and secondary fuel, resulting in reduced emissions of the gas turbine engine.

Although the illustrations of the present injector 70 include a single pair of coannular outlets 86, it should be understood that any number of outlets 86 may be used. In addition, while reference has been made throughout the description to the axial fuel staging occurring in the transition duct 54 of the combustor 16, it should be understood that the present injector 70 may be used in the aft end of the liner (between the head end 50 and the transition duct 54), or it may be used at any location downstream of the head end 50 in combustors having a unified liner and transition duct (sometimes referred to as a "unibody"). Thus, the term "transition duct" is appropriately interpreted as a structure for conveying hot combustion gasses from the head end 50 of the combustor 10 to the turbine section 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An axial fuel staging injector for a gas turbine comprising:
    a body comprising an upstream end and a downstream end, the body defining a primary compressed air flow path through which compressed air flows from a compressed air source to a transition duct of a gas turbine combustor, the body comprising a plurality of outlets disposed on an interior surface thereof, wherein each outlet of the plurality of outlets comprises:
    a secondary fuel conduit in fluid communication with a secondary fuel source, the secondary fuel conduit comprising a first wall that defines a secondary fuel path; and
    a secondary compressed air conduit disposed radially outward of the secondary fuel conduit and in fluid communication with the compressed air source, the secondary compressed air conduit includes a second wall disposed about the first wall in a substantially coannular arrangement, wherein the first wall and the second wall define a secondary compressed air flow path;
    wherein each outlet is configured to inject a secondary fuel and the compressed air into the primary compressed air flow path in a direction transverse to the primary compressed air flow path, thereby forming a fuel-air mixture;
    wherein the body of the axial fuel staging injector is mounted to the transition duct and is downstream of a first combustion zone, and wherein the fuel-air mixture is injected into combustion oases of the first combustion zone downstream of the first combustion zone.

2. The axial fuel staging injector of claim 1, wherein the injector is configured to direct the fuel-air mixture to the transition duct of a combustor of the gas turbine.

3. The axial fuel staging injector of claim 1, wherein the secondary fuel is natural gas, liquefied natural gas (LNG), syngas, methane, ethane, butane propane, biogas, sewage gas, landfill gas, coal mine gas, gasoline, diesel, naphtha, kerosene, methanol, biofuel, or a combination thereof.

4. The axial fuel staging injector of claim 1, wherein the first wall has an inside diameter of about 0.105 inches and an outside diameter of about 0.125 inches.

5. The axial fuel staging injector of claim 1, wherein the second wall has an inside diameter of about 0.175 inches and an outside diameter of about 0.195 inches.

6. The axial fuel staging injector of claim 1, wherein the interior surface of the body has a substantially oval shape, and the secondary compressed air conduit is concentric with the secondary fuel conduit.

7. The axial fuel staging injector of claim 6, wherein the substantially oval shape of the interior surface of the body includes a fore side and an aft side, the fore and aft sides being connected by arcuate end walls, and wherein the plurality of outlets is evenly spaced along the fore side and the aft side of the body.

8. A gas turbine comprising:
    a compressor configured to compress air; and
    a combustor configured to receive compressed air from the compressor, receive a primary fuel from a primary fuel source, and combust a mixture of the compressed air and primary fuel, resulting in combustion fluids, wherein the combustor comprises:
    a transition duct fluidly coupling the combustor to a turbine, configured to direct the combustion fluids toward the turbine; and
    an axial fuel staging injector coupled to the transition duct comprising:
        a body comprising an upstream end and a downstream end, the body defining a primary compressed air flow path through which a primary compressed air flows from the compressor to a transition duct of a gas turbine combustor; and a plurality of outlets disposed on an interior surface of the body, wherein each outlet of the plurality of outlets comprises:

a secondary fuel conduit in fluid communication with a secondary fuel source, the secondary fuel conduit comprising a first wall that defines a secondary fuel path; and a secondary compressed air conduit disposed radially outward of the secondary fuel conduit and in fluid communication with the compressor, the secondary compressed air conduit comprising a second wall disposed about the first wall in a substantially coannular arrangement, wherein the first wall and the second wall define a secondary compressed air flow path; wherein each outlet is configured to inject a secondary fuel and a secondary compressed air into the primary compressed air flow path in a direction transverse to the primary compressed air flow path, thereby forming a fuel-air mixture;

wherein the body of the axial fuel staging injector is mounted to the transition duct and is downstream of a first combustion zone, and wherein the fuel-air mixture is injected into combustion gases of the first combustion zone downstream of the first combustion zone.

9. The gas turbine of claim 8, wherein the plurality of outlets are disposed on the interior surface of the upstream end of the body.

10. The gas turbine of claim 8, wherein a plurality of the axial fuel staging injector is disposed circumferentially and axially about the transition duct.

11. The gas turbine engine of claim 8, wherein the secondary fuel and the primary fuel are the same.

12. The gas turbine engine of claim 8, wherein the interior surface of the body has a substantially oval shape, including a fore side and an aft side, wherein the fore and aft sides are connected by arcuate end walls, and wherein the plurality of outlets is evenly spaced along the fore side and the aft side of the body.

13. The gas turbine engine of claim 8, wherein the first wall has an inside diameter of about 0.105 inches and an outside diameter of about 0.125 inches.

14. The gas turbine engine of claim 8, wherein the second wall has an inside diameter of about 0.175 inches and an outside diameter of about 0.195 inches.

* * * * *